Patented Dec. 5, 1944

2,364,056

UNITED STATES PATENT OFFICE 2,364,056

INDENYL ISOPHORONE

Herman A. Bruson, Philadelphia, Pa., assignor to The Resinous Products & Chemical Company, Philadelphia, Pa., a corporation of Delaware No Drawing. Application August 21, 1943, Serial No. 499,518

3 Claims. (Cl. 260—590)

This invention relates to indenyl isophorone and to a method for its preparation.

According to this invention, indene is condensed with isophorone in the presence of an alkaline condensing agent as catalyst to yield indenyl isophorone, a new chemical compound having the probable formula:

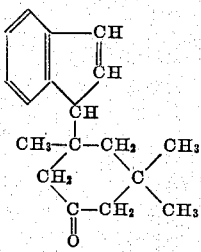

Indenyl isophorone is a crystalline solid melting at 90°–91° C. and is useful as an intermediate for the preparation of pharmaceutical and insecticidal materials.

Typical alkaline condensing agents which can be used for the purpose of this invention are, for example, the oxides, hydroxides, amides, hydrides or alcoholates of the alkali metals, such as lithium, sodium, or potassium methylate, sodium oxide, sodium hydroxide, or strong non-metallic bases, such as quaternary ammonium hydroxides or piperidine. Potassium hydroxide or trimethyl benzyl ammonium hydroxide are particularly suitable agents. Only a small quantity of the alkaline condensing agent is required—1% to 5% on the weight of the components being sufficient.

The reaction which occurs may be expressed as follows:

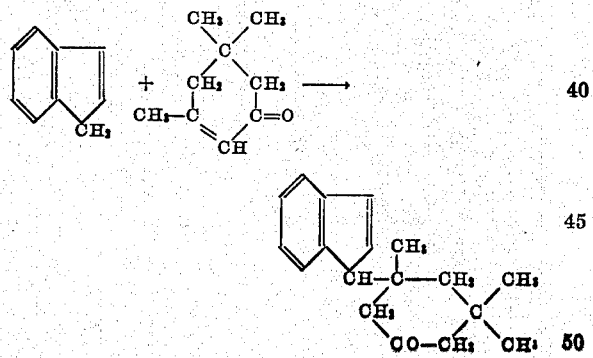

The reaction between isophorone and indene may be carried out by mixing the reactants directly or in the presence of an inert solvent, such as a liquid hydrocarbon, for example xylene, toluene, cymene, or petroleum naphtha. The indene may be pure or may be a commercial product carrying other hydrocarbons. The mixture may be heated in the presence of an alkaline condensing agent at about 80° C. to 170° C. under normal, increased, or reduced pressure. When the reaction has been carried to an acceptable stage of completion, the catalyst may be removed and the product isolated by conventional procedures.

The following example illustrates this invention:

A mixture consisting of 138 grams of isophorone and 142 grams of technical 82% indene was heated with 10 grams of methanolic 30% potassium hydroxide for six hours at 95° C. The product was cooled, neutralized with dilute hydrochloric acid, washed thoroughly with hot water, dried, and distilled under reduced pressure. The product boiling at 185°–190° C./5 mm. was a viscous yellow oil which solidified to a crystalline mass when mixed with cold petroleum ether. After recrystallization from petroleum ether with the use of charcoal to remove the color, the pure indenyl isophorone was obtained in the form of colorless crystals melting at 90°–91° C.

By analysis, this compound contained 84.80% of carbon and 8.50% of hydrogen. This compares with the theoretical values of carbon and hydrogen calculated for the compound $C_{18}H_{22}O$: carbon, 85.04%; hydrogen, 8.66%.

I claim:

1. As a new compound, indenyl isophorone, said compound when pure consisting of colorless crystals melting at 90°–91° C.

2. A method for preparing indenyl isophorone which comprises reacting indene with isophorone in the presence of an alkaline condensing agent.

3. A method for preparing indenyl isophorone which comprises reacting indene with isophorone in the presence of an alkali metal hydroxide.

HERMAN A. BRUSON.